(12) United States Patent
Taylor et al.

(10) Patent No.: US 9,703,681 B2
(45) Date of Patent: Jul. 11, 2017

(54) PERFORMANCE OPTIMIZATION TIP PRESENTATION DURING DEBUGGING

(71) Applicant: Microsoft Corporation, Redmond, WA (US)

(72) Inventors: Daniel Joshua Taylor, Redmond, WA (US); Andrew Brian Hall, Redmond, WA (US); Karl Melder, Seattle, WA (US); Daniel Demetris George Moth, Seattle, WA (US); Zhaoqing Wu, Redmond, WA (US); Oleg Izmerly, Redmond, WA (US); Gregory Miskelly, Seattle, WA (US); Jackson Michael Davis, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 225 days.

(21) Appl. No.: 14/444,987

(22) Filed: Jul. 28, 2014

(65) Prior Publication Data

US 2015/0347274 A1 Dec. 3, 2015

Related U.S. Application Data

(60) Provisional application No. 62/004,234, filed on May 29, 2014.

(51) Int. Cl.
  *G06F 9/44* (2006.01)
  *G06F 11/36* (2006.01)
  *G06F 11/34* (2006.01)

(52) U.S. Cl.
  CPC ...... *G06F 11/3664* (2013.01); *G06F 11/3466* (2013.01); *G06F 11/362* (2013.01); *G06F 11/3409* (2013.01); *G06F 2201/865* (2013.01)

(58) Field of Classification Search
  CPC ............... G06F 11/362; G06F 11/3466; G06F 11/3664; G06F 11/3409; G06F 2201/865
  (Continued)

(56) References Cited

U.S. PATENT DOCUMENTS 5,450,586 A    9/1995 Kuzara et al.
5,956,479 A *  9/1999 McInerney ......... G06F 11/3664
                                                714/38.13
(Continued)

FOREIGN PATENT DOCUMENTS

EP    1 331 566 A2    7/2003
EP    1 970 803 A2    9/2008

OTHER PUBLICATIONS

Allen D Malony et al: "Overhead Compensation in Performance Profiling" The International Journal of High Performance Computing Applications, May 1, 2007 (May 1, 2007), pp. 174-194, XP055204552, Sage UK: London, England, DOI: 10.1177/1094342007077862, Retrieved from the Internet: URL:http://search.proquest.com/docview/220 795053, abstract, p. 120, line 26-p. 123, line 24.
(Continued)

*Primary Examiner* — Marina Lee
(74) *Attorney, Agent, or Firm* — Ogilvie Law Firm

(57) ABSTRACT

Assistance is given to aid in optimizing a program's performance during initial development while the program's features are still being implemented and/or debugged, without interfering with that development, by providing easy-to-ignore yet accurate tips about a program's performance inside a debugger. Raw performance information for a software program which is being debugged in a debugger is adjusted by removing from it a measured debug overhead or other diagnostic overhead. Some factors considered when measuring overhead include pauses, context switches, debug versus release build presence, bounds checking, funceval, (Continued)

and call stack analyses. The debugger is enhanced to display the adjusted program performance measure in a graphical user interface, next to the corresponding source code. The enhanced debugger updates the adjusted program performance measure value and keeps its screen location current as the developer moves through the source code, providing more detailed performance information upon request.

20 Claims, 7 Drawing Sheets

(58) Field of Classification Search
USPC .......................................................... 717/125
See application file for complete search history.

(56) References Cited

U.S. PATENT DOCUMENTS

| | | | |
|---|---|---|---|
| 6,349,406 B1 | 2/2002 | Levine | |
| 6,374,369 B1* | 4/2002 | O'Donnell | G06F 11/3466 714/38.11 |
| 6,854,073 B2 | 2/2005 | Bates et al. | |
| 7,716,643 B2 | 5/2010 | Goldin | |
| 7,900,011 B2 | 3/2011 | Amundsen et al. | |
| 8,091,074 B2 | 1/2012 | Lyon-Smith | |
| 8,302,006 B2* | 10/2012 | Stanek | G06F 3/0482 715/711 |
| 8,522,209 B2 | 8/2013 | Wintergerst et al. | |
| 8,595,702 B2* | 11/2013 | Maybee | G06F 11/3636 707/736 |
| 8,935,673 B1* | 1/2015 | Ashkenazi | G06F 11/3636 702/186 |
| 9,239,773 B1* | 1/2016 | Teplitsky | G06F 11/3636 |
| 2005/0039169 A1* | 2/2005 | Hsu | G06F 11/3664 717/124 |
| 2006/0212867 A1 | 9/2006 | Fields et al. | |
| 2007/0074168 A1* | 3/2007 | Bates | G06F 11/3664 717/124 |
| 2008/0209354 A1* | 8/2008 | Stanek | G06F 9/45512 715/767 |
| 2009/0089801 A1* | 4/2009 | Jones | G06F 11/3466 719/318 |
| 2009/0144705 A1* | 6/2009 | Oda | G06F 11/3644 717/125 |
| 2011/0099538 A1* | 4/2011 | Naidu Pujala | G06F 11/3636 717/124 |
| 2011/0283266 A1 | 11/2011 | Gallagher et al. | |
| 2011/0289482 A1 | 11/2011 | Bentley | |
| 2012/0266140 A1* | 10/2012 | Bates | G06F 11/3664 717/125 |
| 2014/0282415 A1* | 9/2014 | Ovadia | G06F 11/3636 717/125 |
| 2014/0317602 A1* | 10/2014 | Zuo | G06F 11/362 717/125 |
| 2015/0347274 A1* | 12/2015 | Taylor | G06F 11/362 717/125 |

OTHER PUBLICATIONS

International Search Report, PCT/US2015/032089, mailed Jul. 31, 2015, 12 pages.
"Xcode OpenGL ES Tools Overview", retrieved Jun. 5, 2014, <<https://developer.apple.com/library/prerelease/ios/documentation/3DDrawing/Conceptual/OpenGLES_ProgrammingGuide/ToolsOverview/ToolsOverview.html>>, 13 pages.
"Get history and other info about your code", <<http://msdn.microsoft.com/en-us/library/dn269218.aspx>>, retrieved May 23, 2014, 15 pages.
"New CodeLens Indicator—Incoming Changes", <<http://blogs.msdn.com/b/visualstudioalm/archive/2014/03/03/new-codelens-indicator-incoming-changes.aspx?wa=wsignin1.0, Mar. 3, 2014, 7 pages.
"Microsoft CodeLens Code Health Indicator extension", <<http://visualstudiogallery.msdn.microsoft.com/f85a7ab9-b4c2-436c-a6e5-0f06e0bac16d>>, retrieved May 23, 2014, 2 pages.
"Xcode Overview", <<https://developer.apple.com/library/ios/documentation/ToolsLanguages/Conceptual/Xcode_Overview/DebugYourApp/DebugYourApp.html>>, Mar. 10, 2014 , 18 pages.
"Debug Navigator Help: Using Debug Gauges", <<https://developer.apple.com/library/prerelease/ios/recipes/xcode_help-debug_navigator/using_debug_gauges/using_debug_gauges.html>>, May 28, 2014, 3 pages.
"Second Written Opinion Issued in PCT Application No. PCT/US2015/032089", Mailed Date : Apr. 12, 2016, 8 Pages.
"International Preliminary Report on Patentability Issued in PCT Application No. PCT/US2015/032089", Mailed Date: Jun. 29, 2016, 9 Pages.
U.S. Appl. No. 62/004,234, filed May 29, 2014, Daniel Joshua Taylor, et al.

* cited by examiner

SOME PROGRAM PERFORMANCE MEASURES 206

| |
|---|
| MEMORY USAGE 302 BY NATIVE CODE PORTION 304 |
| MEMORY USAGE 306 BY MANAGED CODE PORTION 308 |
| MEMORY USAGE 310 BY PARTICULAR PROCESSOR 110 |
| ALLOCATED HEAP 312 MEMORY USAGE 314 |
| PROCESSOR USAGE 316 |
| LOW-LEVEL PROCESSOR EVENTS 318 |
| ELAPSED RUNNING TIME 320 |
| FRAME RATE 322 |
| THREAD ACTIVITY INFORMATION 324 |
| NONVOLATILE STORAGE SUBSYSTEM 326 USAGE 328 |
| NETWORK INTERFACE 330 USAGE 332 |
| SAMPLED WEIGHTED RESOURCE 338 USAGES 334, 336 |

Fig. 3

ASPECTS OF DEBUGGER GUI 122

| | |
|---|---|
| WINDOW(S) 402 | VISUAL REPRESENTATION 210 |
| CURSOR 426 | LINES 212 OF SOURCE CODE |
| FONT SIZE(S) 406 | NUMBER 408 OF CHARS 410 |
| BREAKPOINT 228 CONTROLS 418 AND DISPLAY 420 ||
| SELECTION 422 INDICATION(S) 424 | DISPLAY AREA(S) 428 |
| CALL STACK 416 INFORMATION 414 | |

Fig. 4

```
72    var folder = Windows.Storage.KnownFolders.PicturesLibrary;
73    await ProcessSubFolders(folder);
74
75    if (chkGroup.IsChecked == true)   1247ms
76    {
```

Fig. 7

```
var folder = Windows.Storage.KnownFolders.PicturesLibrary;
await ProcessSubFolders(folder);

if (chkGroup.IsChecked == true)
{
    var query = from image in m_images
```

Approximately 1,247ms of total program time elapsed since the last break in debugging. The process used about 25ms of CPU in that time.

PERFORMANCE OPTIMIZATION TIP PRESENTATION DURING DEBUGGING

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATION

To the full extent permitted by applicable law, the present application incorporates by reference the entirety of U.S. provisional patent application Ser. No. 62/004,234 filed May 29, 2014, and also claims priority to said provisional patent application.

BACKGROUND

Understanding the cause of software program performance issues may involve analysis of large sets of data, in terms of sample counts, items sampled, and artifacts potentially related to various samples, for example. Performance optimization is often a user-driven operation, during which a global view of application performance is presented to the user. For example, a user may be told by a profiler tool that a profiled program's execution lasted X milliseconds, or that Y disk I/O operations were performed, or that Z kilobytes of memory were allocated by the program. The user digs through the performance data presented, calls for other data to be presented, and eventually manually identifies areas of code which may be causing the perceived performance issues. Familiarity with the program's source code and with subtleties of performance causes are either presumed, or at the least helpful.

SUMMARY

Some embodiments are directed to the technical problem of optimizing a program's performance during initial development while the program's features are still being implemented and/or debugged, without interfering with that development. Some embodiments provide easy-to-ignore tips about a program's performance inside a debugger, so a developer implementing the program's features can make performance optimizations during development if desired, but is not distracted from the main flow of development and is not required to master performance subtleties or profiler intricacies.

Some embodiments automatically obtain raw performance information for a software program which is being debugged in a debugger. This raw information may provide a developer with very rough indications of performance issues, but the raw information is often skewed by performance subtleties such as effects of running in a debugger, effects of mixing release code with debug code, effects of developer actions during debugging, or thread activity impacts. Some embodiments automatically remove a measured diagnostic overhead from at least part of the raw performance information, thereby producing at least one adjusted program performance measure. The adjusted program performance measure is automatically displayed in a debugger graphical user interface, using a visual representation which is associated visually with a few lines of pertinent source code, namely, source code whose corresponding executable code contributed most recently to the program performance in question.

In some embodiments, a profiler obtains raw performance information for a software program. A debugger provides commands to set or clear user-specified breakpoints in the software program. Debug overhead removal code produces at least one adjusted program performance measure for the software program. Raw performance information obtained by the profiler is adjusted at least in part by removing a measured debug overhead from it. The debugger is enhanced to display the adjusted program performance measure in a graphical user interface, next to the corresponding source code. The enhanced debugger updates the adjusted program performance measure value and keeps its screen location current as the developer moves through the source code.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 3 is a block diagram illustrating some performance measures in an example architecture, such as the architecture of FIG. 2 or another architecture;

FIG. 4 is a block diagram illustrating aspects of a debugger graphical user interface ("GUI") in an example architecture, such as the architecture of FIG. 2 or another architecture;

FIG. 7 is a partial screenshot illustrating a visual representation of an adjusted program performance measure in a source code window according to some embodiments;

FIG. 8 is a partial screenshot illustrating a supplemented form of the visual representation shown in FIG. 7;

FIG. 9 is a partial screenshot illustrating two visual representations of respective adjusted program performance measures in a source code window according to some embodiments.

DESCRIPTION

Acronyms

Some acronyms are defined below, but others may be defined elsewhere herein or require no definition to be understood by one of skill.

Figure 9:
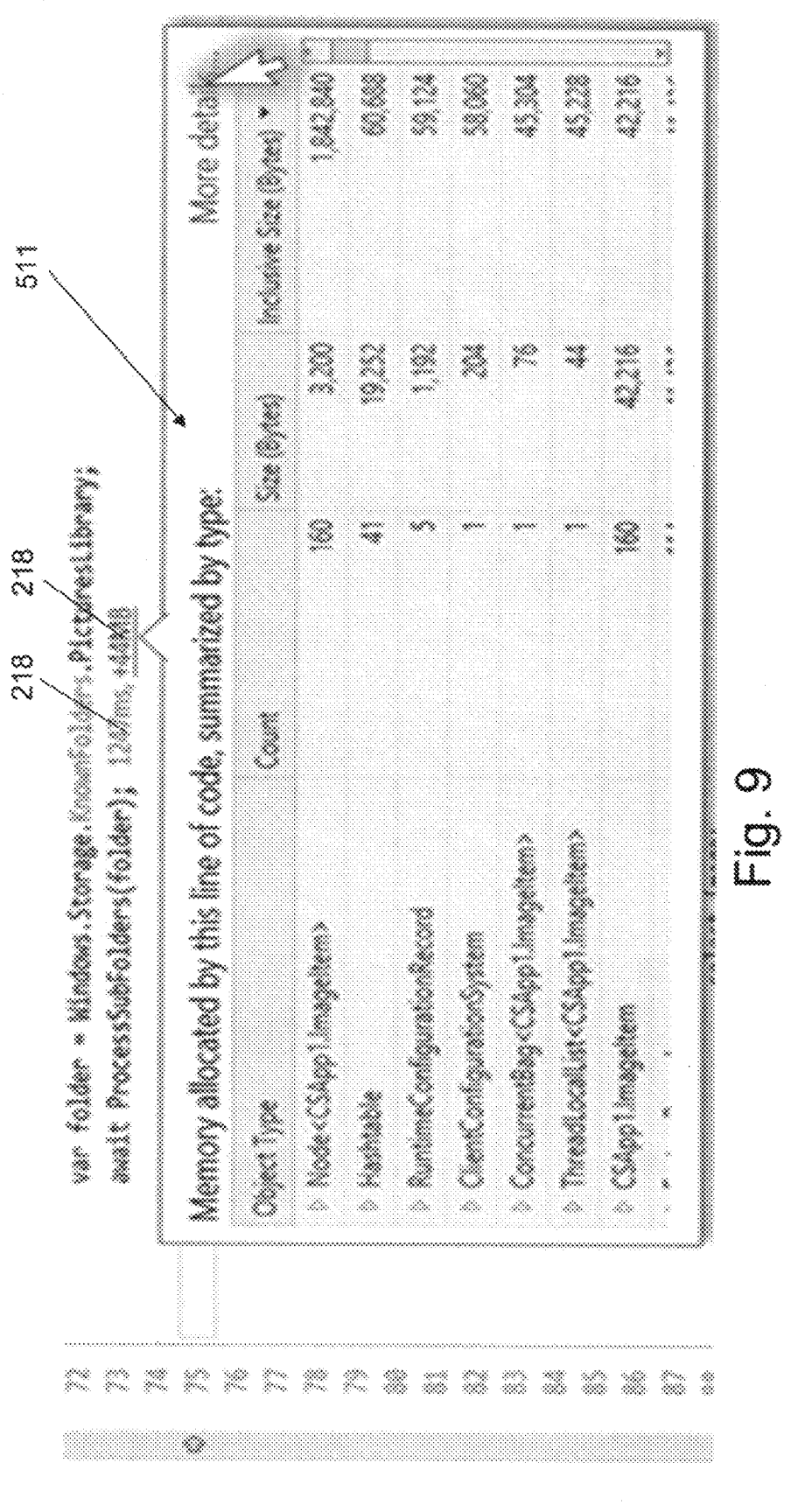
Figure 10:
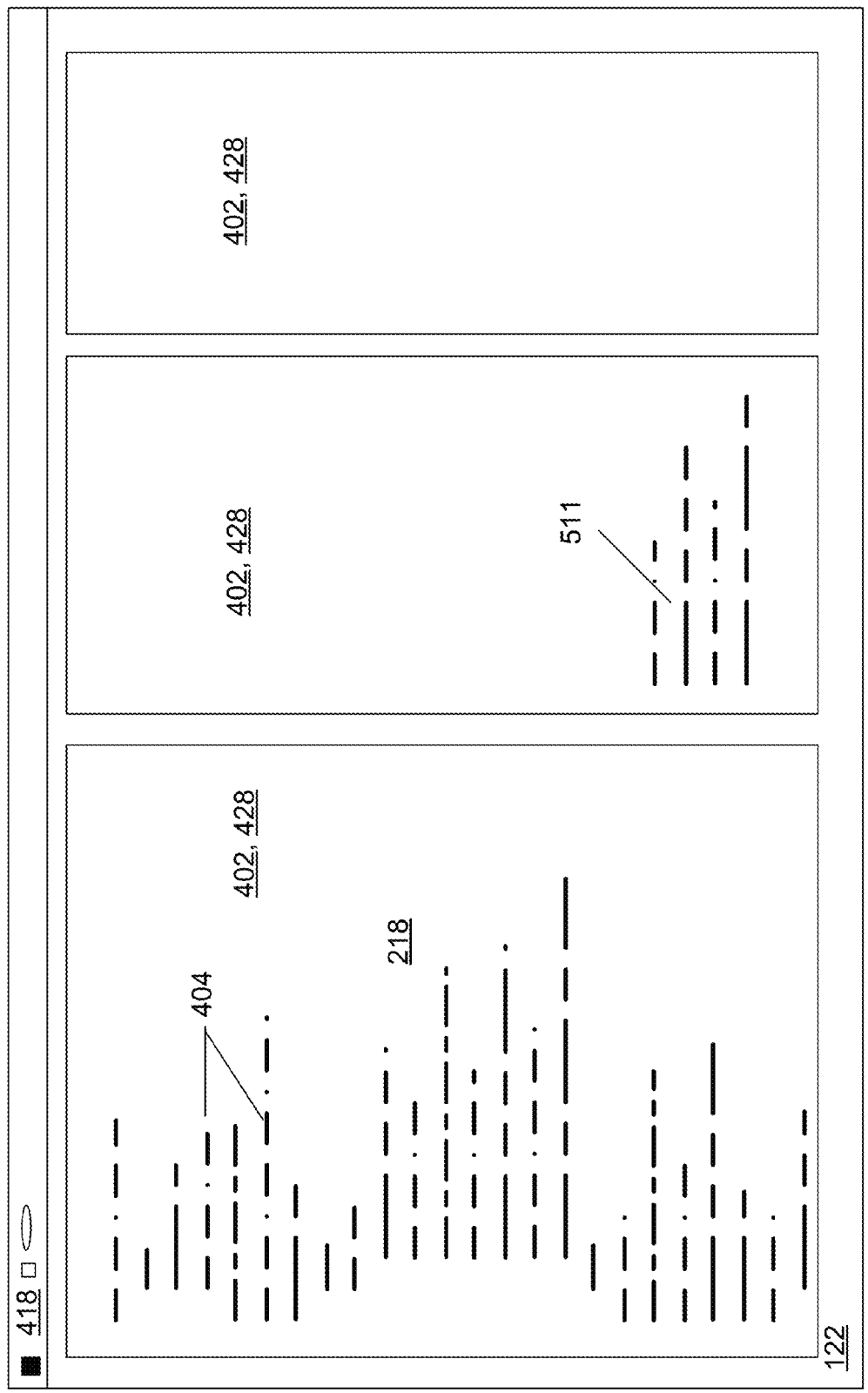
FIG. 10 is a generalized screenshot illustrating source code in a source code window, and also showing other items in a debugger GUI according to some embodiments.

ALU: arithmetic and logic unit
API: application program interface
CD: compact disc
CPU: central processing unit
DVD: digital versatile disk or digital video disc
FPGA: field-programmable gate array
FPU: floating point processing unit
GPU: graphical processing unit
GUI: graphical user interface
IDE: integrated development environment, sometimes also called "interactive development environment"
RAM: random access memory
ROM: read only memory
Source Code Used For Examples Portions of this disclosure contain source code listings; these appear in the specification text and in FIGS. 7 through 9. The source code listings are included in the disclosure to help describe some embodiments which include visual representations displayed near source code; the source code is not being included for its own specific content. That is, the source code listings are not presented as part of a collection of source code which, if compiled, would then implement performance tip display, overhead removal, program performance measure adjustment, or other features of claimed embodiments. The source code shown in the specification and in FIGS. 7 through 9 is thus like the source code depiction in FIG. 10, which contains dots and dashes rather than alphanumeric text. The source code is not intended to be essential material per se, or to serve as an incorporation by reference of essential material that is located outside this disclosure document. Thus, there should be no objection to the inclusion of these source code listings in the Figures or specification text in their current form, and no objection to replacing any such source code with a dots-and-dashes depiction in the manner illustrated by FIG. 10.

Nature of Examples

The examples given below are merely illustrative, and are not intended to fully identify key features or essential features of the claimed subject matter, nor are they intended to be used to limit the scope of the claimed subject matter.

Some examples described herein may be viewed in a broader context. For instance, concepts such computational resource usage, debugging, graphical user interfaces, performance optimization, performance profiling, and user experience may be relevant to a particular example. However, it does not follow from the availability of a broad context that exclusive rights are being sought herein for abstract ideas; they are not. Rather, the present disclosure is focused on providing appropriately specific examples whose technical effects fully or partially solve particular technical problems. Other media, systems, and methods involving computational resource usage, debugging, graphical user interfaces, performance optimization, performance profiling, and/or user experience are outside the present scope. Accordingly, vagueness, mere abstractness, lack of technical character, and accompanying proof problems are also avoided under a proper understanding of the present disclosure.

The technical character of examples described herein will be apparent to one of ordinary skill in the art, and will also be apparent in several ways to a wide range of attentive readers. First, some examples include technical aspects such as debugger breakpoints, computational resource usage measurements, source code presentation, and executable code execution. Second, some examples include technical components such as interfaces to debuggers and program performance profilers. Third, technical effects provided by some examples include presentation of program performance measures (e.g., computational resource usage) during debugging at one or more points when a debugger receives or takes control from a program that is being debugged. Fourth, some examples include technical adaptations such as performance presentation tips, thresholds for performance tip presentation, and right-of-code positioning of performance tips, and removal of the prior tips from the display when a new set of one or more performance tips is displayed. Fifth, some examples modify technical functionality of a debugger or an integrated development environment by presenting program performance optimization tips during debugging and providing direct navigation into more detailed information from a profiling tool while simultaneously making the performance tips unobtrusive to a developer within a debugger session. Technical results include more efficiently performed program optimizations because optimizations can be made while the code in question is in front of its developer and understanding of that code is fresh in the developer's mind, as well as more highly optimized code because optimizations are performed that would otherwise have been skipped as too onerous to implement or would have been overlooked as possibilities.

TERMINOLOGY

Reference is made to exemplary examples, and specific language will be used herein to describe the same. But alterations and further modifications of the features illustrated herein, and additional technical applications of the abstract principles illustrated by particular examples herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be added in subsequent filings along with figures, but they are not required to understand the present disclosure. The inventors assert and exercise their right to their own lexicography. Quoted terms are defined explicitly, but quotation marks are not used when a term is defined implicitly. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many examples run on workstation or laptop computers, other examples may run on other computing devices, and any one or more such devices may be part of a given example.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed examples so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an example was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. It is the inventors' present intention that none of the claims pursued in the United States are or will be directed to mere propagated signals or to signals per se. For the purposes of patent protection in the United States, a memory or other computer-readable storage medium is not a propagating signal or a carrier wave outside the scope of patentable subject matter under United States Patent and Trademark Office (USPTO) interpretation of the *In re Nuijten* case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting aspect combination is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Operating Environments

Figure 1:
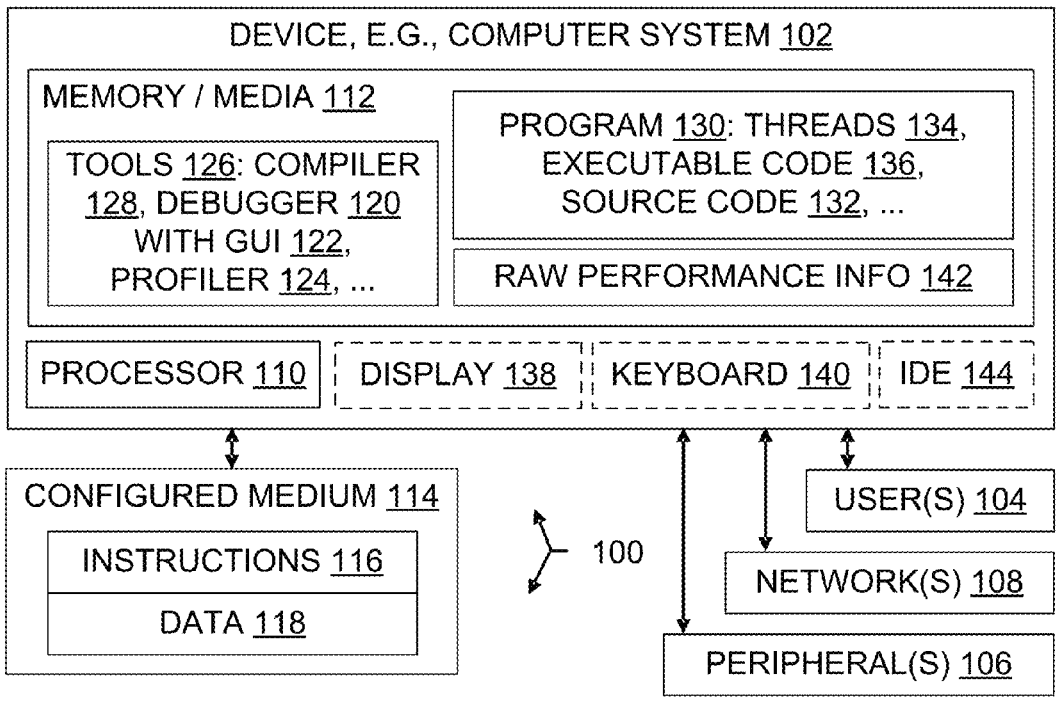
FIG. 1 is a block diagram illustrating a computer system having at least one processor and at least one memory which interact with one another under the control of software for debugging and performance profiling, and other items in an operating environment which may be present on multiple network nodes, and also illustrating configured storage medium (as opposed to a mere signal) embodiments.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

As another example, a game may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In some environments 100, one or more original debuggers 120, debugger GUIs 122, profilers 124, and/or other tools 126 have code whose behavior is modified according to some or all of the changes and enhancements described herein. Software development tools 126 such as compilers 128 also assist with software development by producing and/or transforming program 130 source code 132 into threads 134 and/or other executable code 136. The codes 132, 136 and other items may each reside partially or entirely within one or more hardware media 112, thereby configuring those media for technical effects which go beyond the "normal" (i.e., least common denominator) interactions inherent in all hardware—software cooperative operation. In addition to processors 110 (CPUs, ALUs, FPUs, and/or GPUs), memory/storage media, display(s) 138, keyboard(s) 140, and battery(ies), an operating environment 100 may also include other hardware, such as buses, power supplies, wired and wireless network interface cards, and accelerators, for instance, whose respective operations are described herein to the extent not already apparent to one of skill. CPUs are central processing units, ALUs are arithmetic and logic units, FPUs are floating point processing units, and GPUs are graphical processing units.

A debugger 120 is a computer program used to test and debug other programs 130, which are referred to as debuggee programs or simply as "debuggees". Source-level debuggers 120 show a developer 104 debuggee source code 132 during debugging. A debugger 120 generally provides a software developer 104 with some control over debuggee execution, such as pausing execution to examine the debuggee's variables and other internal state information, stepping through debuggee code line-by-line, and setting a breakpoint to stop debuggee execution when a specified condition occurs within the debuggee. Some debuggers 120 also allow a developer 104 to modify the debuggee's internal state during debugging by setting variables, instead of merely observing the internal state.

A profiler 124 is a computer program used to obtain raw performance information 142 about program 130 execution. Raw information 142 is data about usage of a computational resource which has not been filtered, divided, or factored on the basis of what did or did not contribute to that usage. For example, the number of processor cycles expended is raw information about processor 110 usage, whereas data obtained by filtering out processor usage by operating system code would not be raw information.

A given operating environment 100 may include an Integrated Development Environment (IDE) 144 which provides a developer with a set of coordinated software development tools 126 such as compilers, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with technical endeavors outside the field of software development per se.

One of skill will appreciate that the foregoing aspects and other aspects presented herein under "Operating Environments" may also form part of a given embodiment. This document's headings are not intended to provide a strict classification of features into embodiment and non-embodiment feature classes.

One or more items are shown in outline form in the Figures to emphasize that they are not necessarily part of the illustrated operating environment or all embodiments, but may interoperate with items in the operating environment or some embodiments as discussed herein. It does not follow that items not in outline form are necessarily required, in any Figure or any embodiment. In particular, FIG. 1 is provided for convenience; inclusion of an item in FIG. 1 does not imply that the item, or the describe use of the item, was known prior to the current innovations.

Systems

Figure 2:
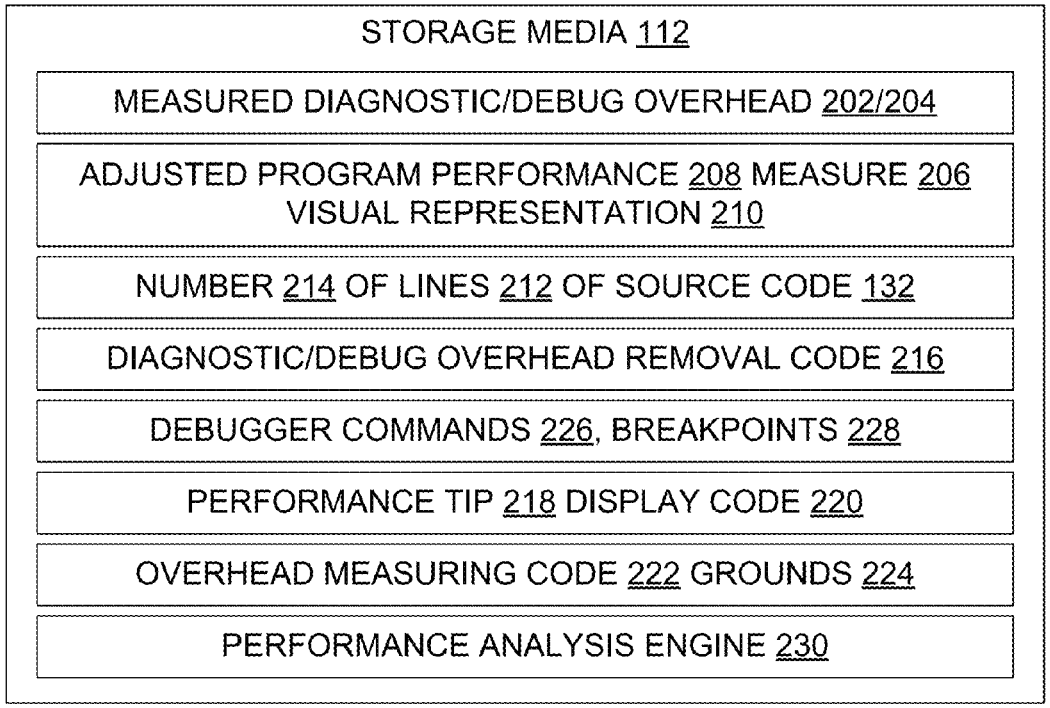
FIG. 2 is a block diagram illustrating aspects of performance tip provision in an example architecture.

FIG. 2 illustrates aspects of an architecture which is suitable for use with some embodiments. A debugger 120 includes commands 226 to step through code 132, 136 and perform other familiar actions, including setting and clearing breakpoints 228. During debugging, raw performance information is gathered incrementally as portions of the debuggee program 130 execute in between breakpoints. Raw performance information 142 may include overhead caused at least in part by a debugger, a profiler, or another diagnostic tool 126. At least a portion of such overhead may be estimated, calculated, projected, or otherwise measured by code 222, based on one or more grounds 224. In particular, some embodiments include measured diagnostic overhead 202 which is attributed to one or more diagnostic tools 126, and some embodiments include measured debugger overhead 204 which is attributed to a debugger 120. A debugger 120 is one example of a diagnostic tool, but not the only example, and thus debugger overhead 204 is one example of diagnostic overhead 202, but not the only example. For instance, diagnostic overhead 202 may also include overhead attributed to a profiler 124.

Removing measured overhead from raw performance data provides an adjusted measure 206 of program 130 performance 208. Removal is performed in some embodiments using overhead removal code 216. Some embodiments display directly, transmit, and/or otherwise provide a visual representation 210 of one or more such adjusted measures 206. Some display one or more adjusted measures 206 within a source code window of a debugger GUI 122 near the lines 212 of source code 132 to which the adjusted measures 206 pertain. In this context, one example of "near" means within a specified number 214 of lines, e.g., on the same line (at a distance of zero), on the immediately preceding line (at a distance of one), or within a distance of five lines. Another example of "near" means within a distance of four lines, and so on, down to a distance of zero, i.e., on the same line 212. Visual representations 210 and other performance tips 218, such as explanatory text and links to additional performance information, are displayed in some embodiments by display code 220.

FIG. 3 illustrates some examples of adjusted program performance measures 206. Each adjusted program performance measure 206 has one or more underlying pieces of raw performance information 142. Correspondence between one or more given kinds of raw data 142 and one or more kinds of adjusted data 206 are either described expressly herein, or are one-to-one, and reference numerals should be understood accordingly.

For example, with regard to memory usage the reference numeral 302 designates an adjusted program performance measure 206 which is specific to memory usage by a native code portion 304 of a program 130, and which is based at least in part on raw information 142 about the usage of memory 112. Similarly, the reference numeral 306 designates an adjusted program performance measure 206 which is specific to memory usage by a managed code portion 308 of a program 130, and which is based at least in part on raw information 142 about the usage of memory 112.

Per FIG. 3, reference numeral 310 designates an adjusted program performance measure 206 which is specific to memory usage by code 136 of a program 130 executed on a particular processor 110, and usage 310 is based at least in part on raw information 142 about the usage of memory 112. Reference numeral 314 designates an adjusted program performance measure 206 which is specific to usage of heap 312, 112 memory by a program 130, and the heap usage 314 is based at least in part on raw information 142 about the usage of heap 312 which is a kind of memory 112.

Per FIG. 3, reference numeral 316 designates an adjusted program performance measure 206 which is specific to usage of one or more processors 110 by a program 130, and is based at least in part on raw information 142 about processor usage. Reference numeral 318 designates one or more adjusted program performance measures 206 specific to low-level events in one or more processors 110 during execution of a program 130, and is based at least in part on raw information 142 about processor events such as cache misses, branch mis-predictions, pipeline stalls, read/write hazards, and/or the number of instructions executed.

Per FIG. 3, reference numeral 320 designates an adjusted program performance measure 206 which is running time attributed to a program 130, and is based at least in part on raw information 142 about running time between two points in time during execution of the program. Periods between those points in which code attributed to the program 130 is not running would be removed, for example, when measuring elapsed running time 320.

Per FIG. 3, reference numeral 322 designates an adjusted program performance measure 206 which is a frame rate attributed to a program 130, and is based at least in part on raw information 142 about the frame rate between two points in time during execution of the program.

Per FIG. 3, reference numeral 324 designates one or more adjusted program performance measures 206 specific to thread activity during execution of a program 130, and is based at least in part on raw information 142 about activity events such as the number of context switches, duration of context switches, duration of I/O bound periods, amount of memory used primarily or solely to implement context switches, number of ready-thread events, and other context switch data. Some embodiments utilize additional thread activity information 142 with respect to context switch and ready thread events, such as which threads were involved, the timestamp they occurred at (relative to other events), and the call stack on the threads involved. Duration, count, and other metrics 324 may be derived from this information 142 in the raw thread events.

Per FIG. 3, reference numeral 328 designates an adjusted program performance measure 206 which is specific to usage of a storage subsystem 326 attributed to a program 130, and is based at least in part on raw information 142 about the usage of the storage subsystem 326 between two points in time during execution of the program. Nonvolatile storage subsystem 326 is an example of memory 112. In some cases a storage subsystem 326 is implemented as a peripheral 106 while in cases it is built-in as an integral part of the system 102.

Per FIG. 3, reference numeral 332 designates an adjusted program performance measure 206 which is specific to usage of a network 108 interface 330 attributed to a program 130, and is based at least in part on raw information 142 about the usage of the network interface 330 between two points in time during execution of the program.

Per FIG. 3, reference numerals 334 and 336 respectively designate adjusted program performance measures 206 which are specific to usage of a sampled uniformly weighted resource, or usage of a sampled proportionately weighted resource attributed to a program 130. Each is based at least in part on raw information 142 about the usage of the resource 338 in question during execution of the program. The resource 338 may be any computational resource, e.g., particular memory 112 or memory 112 overall, particular processor(s) 110 or processors 110 overall, particular peripheral(s) 106 or peripherals 106 overall, particular execution constructs such as threads 134, electrical power consumed, or any other hardware, software, or other computational resource.

FIG. 4 illustrates some aspects of an example debugger GUI 122. GUI content is organized in one or more windows 402 and/or other display areas 428, generally including at least one source code window which displays lines 212 of source code 132 in text having at least one font size 406. Font size, window size, underlying content, and user settings, for example, determine the number 408 of alphanumeric characters 410 displayed for a given item, such as a line of source code or (in enhanced debuggers) a textual visual representation 210 of an adjusted performance measure 206. Other debugger windows 402 may display call chains, call frequency, and other information 414 about one or more call stacks 416. Other debugger windows 402 may display execution results, variable values, and error messages, for example. Controls 418 allow a user 104 to load a program 130 into the debugger 120, display 420 and set and clear breakpoints 228, step through source code to execute corresponding portions of executable code 136, and perform other actions which are described herein or familiar to users 104 of conventional debuggers. Breakpoints 228, source code lines 212, visual representations 210, and other displayed items may be selected 422, as indicated 424 by highlighting, animation, color change, confirmation requests, or performance of a selected functionality. Making a selection 422 may be performed in part by moving a cursor 426 on screen in the GUI 122. Familiar cursors (e.g., vertical line segment, arrow, hand) and cursor movement tools (e.g., mouse, pen, trackpad, arrow keys, tab key) are used in some embodiments.

In some examples peripherals 106 such as human user I/O devices (screen, keyboard, mouse, tablet, microphone, speaker, motion sensor, etc.) will be present in operable communication with one or more processors and memory. Software processes may be users.

In some examples, the system 102 includes multiple computers connected by a network 108. Networking interface equipment can provide access to networks, using components such as a packet-switched network interface card, a wireless transceiver, or a telephone network interface, for example, which may be present in a given computer system 102. However, an example may also communicate technical data and/or technical instructions through direct memory access, removable nonvolatile media, or other information storage-retrieval and/or transmission approaches, or an example in a computer system may operate without communicating with other computer systems.

Some examples operate in a "cloud" computing environment and/or a "cloud" storage environment in which computing services are not owned but are provided on demand. For instance, raw performance info may be gathered from one or more machine in the cloud and then displayed on another machine in the cloud.

Some embodiments include a computer system having a processor 110, and a memory 112 in operable communication with the processor. A profiler 124 resides in the memory and has code which upon execution with the processor obtains raw performance information 142 for a software program 130. A debug overhead removal code 216, upon execution with the processor 110, produces at least one adjusted program performance measure 206 for the software program 130. This is accomplished at least in part by removing a measured debug overhead 204 from at least part of the raw performance information 142 obtained by the profiler 124. An enhanced debugger 120 residing in the memory has a graphical user interface 122 which upon execution with the processor provides commands 226 to set or clear user-specified breakpoints 228 in the software program 130. The debugger 120 is also a source of at least part of the measured debug overhead 204. The enhanced debugger also has code 220 which upon execution with the processor 110 displays the adjusted program performance measure 206 in the debugger graphical user interface 122.

In some examples the debug overhead removal code 216 includes at least one of the following: code for measuring debug overhead based on a pause start time 520 and a pause stop time 522 which together indicate when execution of the software program was paused in the debugger; code for measuring debug overhead based on how many debug context switches 536 occurred during an execution period of the software program in the debugger; or code for measuring debug overhead based on a debug build presence 542 in at least a portion of the software program.

In some examples the system 102 is further characterized in at least one of the following ways: the adjusted program performance measure 206 is displayed in the debugger graphical user interface in a display area 428 which is within zero to five horizontal text lines' 212 distance of a source code text to which the adjusted program performance measure pertains; or the adjusted program performance measure 206 is displayed in a source code window 402 in the debugger graphical user interface and is displayed to the right of a source code text to which the adjusted program performance measure pertains.

In some examples the system 102 is further characterized in at least one of the following ways: the displayed adjusted program performance measure 206, 210 does not obscure or hide any of the software program's source code 132 in the debugger's display areas 428; the displayed adjusted program performance measure does not obscure or hide any user interface control 418 for starting or pausing execution of the software program in the debugger; or the displayed adjusted program performance measure does not obscure or hide any user interface control 418 for setting or clearing a breakpoint in the debugger.

In some examples the system 102 is further characterized in at least one of the following ways: the displayed adjusted program performance measure 206, 210 displays text in a font size 406 that is no larger than the font size used for displaying source code text in the debugger; the displayed adjusted program performance measure 206, 210 uses less than twenty characters 410 of text per computational resource usage shown; an adjusted program performance measure value displayed for a given line 212 of source code text is undisplayed when another adjusted program performance measure value is displayed for a subsequent line 212 of source code text; or the displayed adjusted program performance measure 210 consists of text which conforms to the following syntax 594: <integer>[white space]<time unit>, where <time unit> denotes at least one of: milliseconds, fractions of a second, seconds, or processor cycles.

In some examples the adjusted program performance measure 206 is displayed in the enhanced debugger 120 by default when (a) source code of the software program is displayed in the debugger, and (b) the adjusted program performance measure exceeds a predefined threshold 509.

Processes

Figure 5:
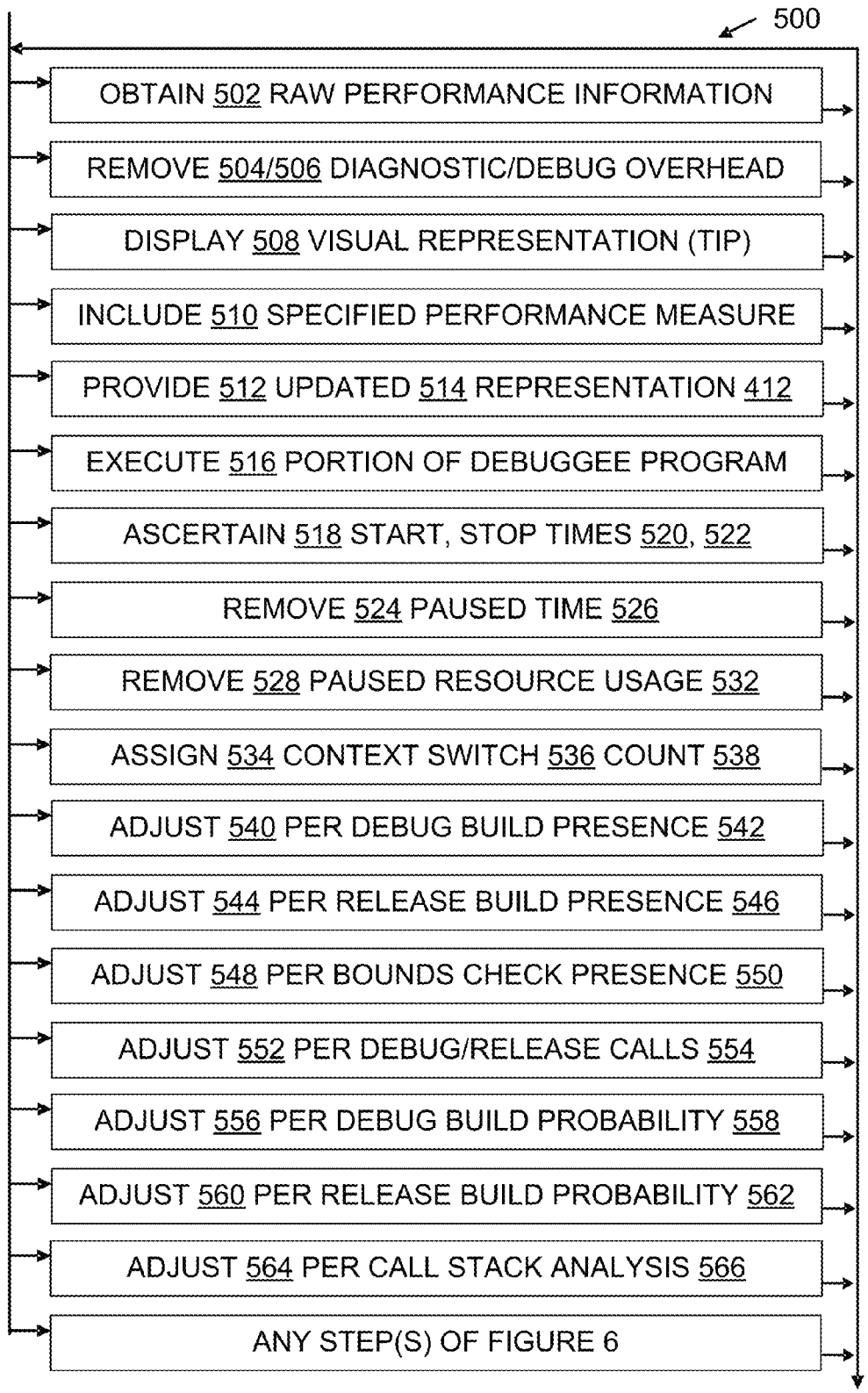
FIGS. 5 and 6 collectively show a flow chart illustrating steps of some process and configured storage medium embodiments.
Figure 6:
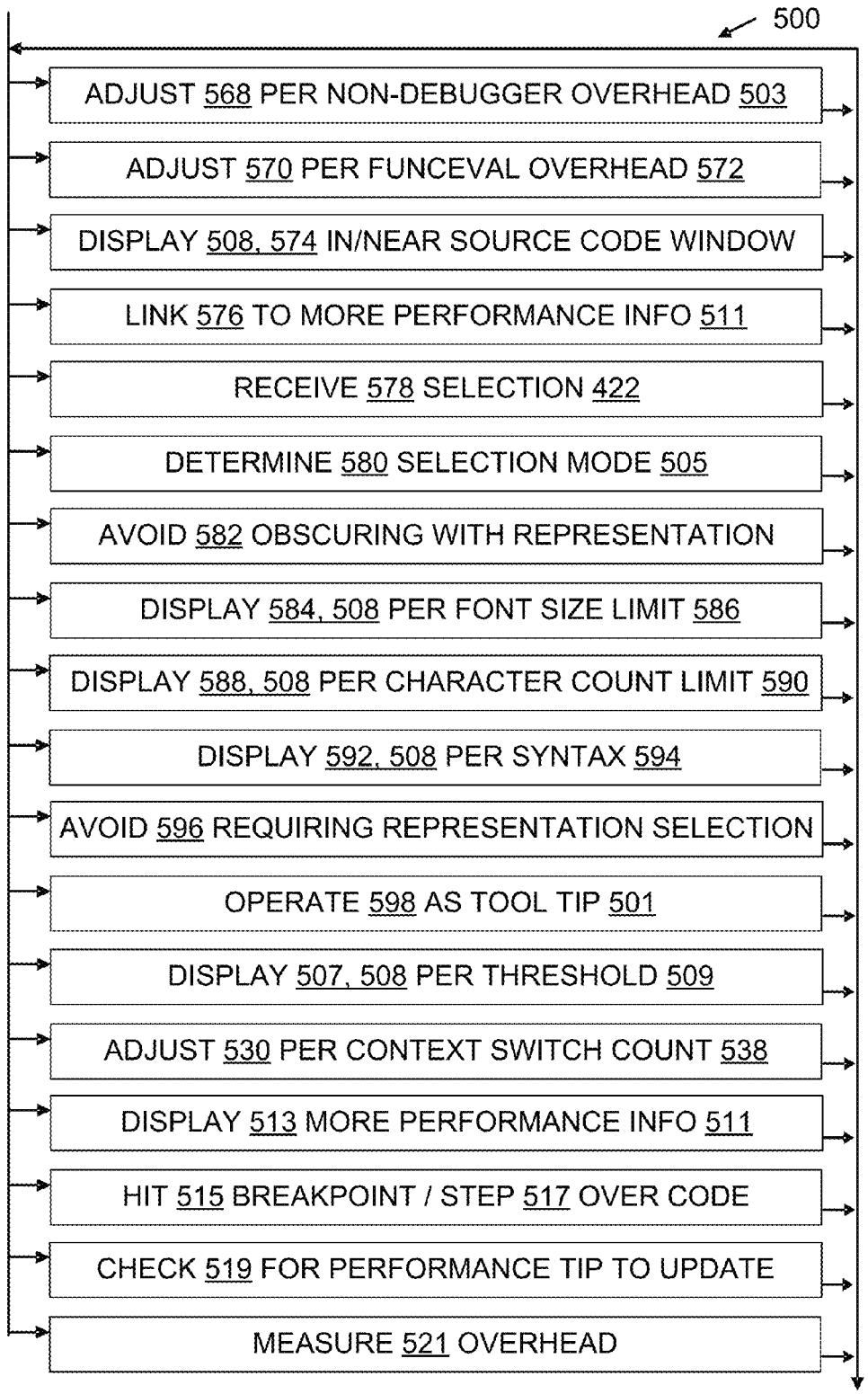

FIGS. 5 and 6 collectively illustrate some process embodiments in a flowchart 500. Technical processes shown in the Figures or otherwise disclosed may be performed in some embodiments automatically, e.g., under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIGS. 5 and 6. Steps may be performed serially, in a partially overlapping manner, or fully in parallel. The order in which flowchart 500 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

In some examples, a computational process for use in software development includes automatically obtaining 502 raw performance information 142 for a software program which is being debugged in a debugger which has a graphical user interface; automatically removing 504 a measured diagnostic overhead from at least part of the raw performance information, thereby producing at least one adjusted program performance measure; and automatically displaying 508 in the debugger graphical user interface a visual representation of the adjusted program performance measure and at least a number of lines of source code whose corresponding executable contributed most recently to the program performance that is measured by the adjusted program performance measure, the number being in the range from one to four. Removing 506 debug overhead is a special case of removing 504 diagnostic overhead, in which the overhead removed is attributed to a debugger.

In some examples, the raw performance information 142 includes 510 a raw value for at least one of the following program performance measures: memory usage by a native code portion of the software program, memory usage by a managed code portion of the software program, memory usage by a particular processor (e.g., CPU, FPU, GPU) allocated heap memory usage, processor usage (e.g., CPU utilization, FPU utilization, GPU utilization), low-level processor events (e.g., cache misses, branch mis-predictions, pipeline stalls, read/write hazards, number of instructions executed), elapsed running time of application code, frame rate, thread activity, nonvolatile storage subsystem usage, network interface usage, electrical power usage, peripheral device usage, allocated resource usage, sampled uniformly weighted resource usage, or sampled proportionately weighted resource usage.

In some examples, the process includes providing 512 updated 514 visual representations 210 of the adjusted program performance measure in a source code window of the debugger in response to execution 516 of portions of the software program in the debugger.

In some examples, removing 504 a measured diagnostic overhead includes ascertaining 518 a pause start time 520 and a pause stop time 522 indicating when execution of the software program was paused in the debugger, and removing 524 paused time 526 from a running time that is calculated for the software program.

In some examples, removing 504 a measured diagnostic overhead includes ascertaining 518 a pause start time 520 and a pause stop time 522 indicating when execution 516 of the software program was paused in the debugger, and removing 528 usage 532 of a computational resource 338 during the paused time from a resource usage that is calculated for the software program.

In some examples, removing 504 a measured diagnostic overhead includes assigning 534 a context switch 536 count 538 representing how many debug context switches 536 occurred during an execution period of the software program 130 in the debugger, and adjusting 530 a raw program performance measure based on the context switch count.

In some examples, removing 504 a measured diagnostic overhead includes adjusting 540 a raw program performance measure based on statistical information about debug build presence 542 in at least a portion of the software program.

In some examples, removing 504 a measured diagnostic overhead includes adjusting 544 a raw program performance measure based on statistical information about release build presence 546 in at least a portion of the software program.

In some examples, removing 504 a measured diagnostic overhead includes adjusting 548 a raw program performance measure based on array bound checking code presence 550 in at least a portion of the software program.

In some examples, removing 504 a measured diagnostic overhead includes adjusting 552 a raw program performance measure based on information 554 about how many times functions in debug builds were called and information 554 about how many times functions in release builds were called during execution of the software program.

In some examples, removing 504 a measured diagnostic overhead includes adjusting 556 a raw program performance measure based on a calculated probability 558 that a portion of the software program is a debug build rather than a release build.

In some examples, removing 504 a measured diagnostic overhead includes adjusting 560 a raw program performance measure based on a calculated probability 562 that a portion of the software program is a release build rather than a debug build.

In some examples, removing 504 a measured diagnostic overhead includes adjusting 564 a raw program performance measure based on a call stack analysis 566 which classifies a portion of the software program as a debug build. In some examples, removing 504 a measured diagnostic overhead includes adjusting 564 a raw program performance measure based on a call stack analysis 566 which classifies a portion of the software program as a release build.

In some examples, removing 504 a measured diagnostic overhead includes adjusting 568 a raw program performance measure based on overhead 503 from a diagnostic tool other than a debugger.

In some examples, removing 504 a measured diagnostic overhead includes adjusting 570 a raw program performance measure based on debugger funceval overhead 572.

In some examples, the displaying step 508 displays a visual representation of the adjusted program performance measure for an executed portion of the software program, wherein a boundary of the executed portion corresponds with a line of source code text displayed in a source code window, and wherein at least a portion of the visual representation of the adjusted program performance measure is displayed 574 in a display area which is within zero to three horizontal text lines' distance of the source code text.

In some examples, the visual representation 210 has a link 576 to additional program performance information 511, and the process further includes receiving 578 a selection 422 of the visual representation by a user; and then displaying 513 at least a portion of the additional program performance information.

In some examples, receiving 578 a selection 422 of the visual representation includes determining 580 a selection mode 505. This includes at least one of the following: determining that a user has clicked on the visual representation; determining that a user has touched the visual representation on a touch-sensitive display screen 138; determining that a user cursor 426 is hovering over the visual representation; or determining that a user has selected the visual representation at least in part by using a keyboard 140.

In some examples, the displaying step 508 displays a visual representation of the adjusted program performance measure which is easily-ignored in that it has at least three of the following characteristics: the visual representation does not obscure or hide (i.e., avoids 582 obscuring) any of the software program's source code in the debugger unless the visual representation is selected; the visual representation does not obscure or hide (i.e., avoids 582 obscuring) any user interface control for starting or pausing execution of the software program in the debugger; the visual representation does not obscure or hide (i.e., avoids 582 obscuring) any user interface control for setting or clearing a breakpoint in the debugger; the visual representation displays 584 text in a font size that is no larger 586 than the font size used for displaying source code text in the debugger; displaying 592 per a visual representation syntax 594; the visual representation uses 588 a limit 590 of less than twenty characters of text per adjusted program performance measure unless the visual representation is selected to display additional information; avoiding 596 requiring representation selection in that selection of the visual representation is not required in order to start or pause execution of the software program in the debugger and/or selection of the visual representation is not required in order to set or clear a breakpoint in the debugger.

In some examples, the visual representation 210 operates 598 as a tool tip 501 to provide additional program performance information 511. Tool tips 501 in a GUI are activated, e.g., by hovering over an item and/or by right-clicking a mouse button. To avoid confusion, note that although performance tips 218 may be implemented using tool tips 501, simple text formats, links, and other performance tip 218 implementations are also taught herein.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as adjusted performance measures 206, visual representations 210, overhead removal code 216, overhead measuring code 222, and/or performance tip display code 220, in the form of data 118 and instructions 116, read from a removable medium 114 and/or another source such as a network connection, to form a configured medium. The configured medium 112 is capable of causing a computer system to perform technical process steps as disclosed herein. FIGS. 1 through 10 thus help illustrate configured storage media embodiments and process embodiments, as well as system and process embodiments. In particular, any of the process steps illustrated in FIG. 5 and/or FIG. 6, or otherwise taught herein, may be used to help configure a storage medium to form a configured medium embodiment.

Additional Examples

Additional details and design considerations are provided below. As with the other examples herein, the features described may be used individually and/or in combination, or not at all, in a given example.

Those of skill will understand that implementation details may pertain to specific code, such as specific user interface elements, APIs and specific sample programs, and thus need not appear in every example of the technology that is disclosed herein. Those of skill will also understand that program identifiers and some other terminology used in discussing details are implementation-specific and thus need not pertain to every example. Nonetheless, although they are not necessarily required to be present here, these details are provided because they may help some readers by providing context and/or may illustrate a few of the many possible implementations of the technology discussed herein.

As to specific parameters stated herein, one of skill will understand that specific numbers shown herein may change from one implementation to another or even within a given implementation by virtue of tweaking code or altering configurable values. In that sense, these parameter values are placeholders subject to change after testing determines an accuracy level that can be achieved. For instance, a default threshold chosen may be adjusted upward, a larger minimum threshold may be imposed, rounding may be introduced to remove an implied level of precision that does not exist, the data presentation itself may be tweaked slightly to make it clearer that it is an approximation, and so on.

Contextual Discussion of Examples

The following examples are derived from Microsoft documentation which provides some overview of the present technology and some context for it. The discussion here is derived from Dev14 discussion documentation. Dev14 refers to a June 2014 release of the Visual Studio® software program implemented by Microsoft Corporation (Visual Studio is a mark of Microsoft Corporation). Aspects of the Visual Studio® program and/or its documentation are or will be consistent with or otherwise illustrate aspects of the examples described herein. However, it will be understood that Visual Studio® documentation and/or implementation choices do not necessarily constrain the scope of such examples, and likewise that Visual Studio® and/or its documentation may well contain features that lie outside the scope of such examples. It will also be understood that the discussion herein is provided in part as an aid to readers who are not necessarily of ordinary skill in the art, and thus may contain and/or omit details whose recitation below is not strictly required to support the present disclosure.

Understanding the cause of performance issues may involve analysis of large sets of data. This is typically a user-driven operation where a global view of application performance is presented to the user, and they are expected to dig through the data and identify the areas of code (e.g., lines and functions) that are causing the performance issue. A relatively small set of users are comfortable with this "global top-down" analysis because it often requires learning the techniques of performance analysis which are foreign to many developers who are used to a code-first development and debugging approach. Due to the perceived esoteric nature of the tools and time investment required to learn how to profile and apply performance analysis techniques, performance analysis tools today are used by a relatively small set of inclined developers and performance issues go unsolved in applications. Some examples described herein seek to reduce the time taken to start performance analysis tools by making them part of the normal code-first debugging experience, and teach developers about performance analysis by surfacing relevant and contextual performance information to the user while they debug through their code.

Some technical aspects of some examples of the technology include the following:

Performance and historical diagnostics data 142 is collected and analyzed while the user 104 is debugging a program 130.

As the user steps with the enhanced debugger 120 through code, performance tips 218 are displayed in the editor next to the line(s) of code that the user stepped over. (Performance tips 218 may be implemented using tool tips 501, but simple text, links, and other performance tip 218 implementations are also taught herein).

Performance tips 218 are easy-to-ignore and show metrics 206 and other information 511 that indicate a potential performance problem to the user related to the line(s) of code that they stepped over (denoted Performance Tips).

The metrics 206 shown in the performance tips are adjusted such that overhead from debugging and debug builds are removed where possible.

The user can click on some performance tips to see a more detailed breakdown 511 of the performance information, and iteratively open more details 511 as desired in order to understand the cause of the performance issue.

The user can turn on additional performance analysis tools 126 in order to get more useful performance tips and a more detailed breakdown of performance information when taking action upon performance tips.

The user can continue to control program execution with the enhanced debugger 120 to set breakpoints 228 and step through code as desired to trigger further performance tips and gather contextual performance information about specific sections of their code.

In some examples, when the user starts debugging a program, performance data collection and analysis is started on that program. In some examples, the level of data collection and analysis is configurable by the user through various debugging tool configuration options so as to balance the runtime impact of performance analysis on the application.

When the user hits a break state in their application through means such as hitting 515 a breakpoint 228, stepping 517 over code, or otherwise passing control to the debugger (perhaps via a hypervisor or operating system), the debugger checks 519 for any performance tips that are relevant to the line(s) of code that have been executed since the last break state by providing a set of information about the current and last break state to a performance analysis engine 230. Such information 511 could include but is not limited to the instruction pointer, function call stack, thread id, local variables, and high-precision timestamp of the break state.

A performance analysis engine 230 uses this information to correlate the debugging actions to the global set of performance data collected and identify potential performance issues that are relevant to the user's code. One example performance analysis engine 230 runs a set of rules over the data relevant to the user's debugging action and detects potential performance issues that meet the criteria set forward in the rule set. A performance analysis engine 230 may also provide a set of actions that the user can take and store further performance data for each performance tip in-order to enable the user to gain more detailed breakdown if desired.

In some examples, a performance analysis engine 230 can measure 521 debug overhead introduced by having a debugger attached and using debug builds of applications. Methods of measuring 521 debug overhead include but are not limited to methods discussed herein.

Measuring 521 debug overhead at least in part by measuring 518 the start/stop times of when the process was paused by the debugger, removing 524 the paused time to calculate the application's running time and removing process activity during the paused time of the application from the performance analysis.

Measuring 521 debug overhead at least in part by measuring the impact of debugger context switches 536 during the running time of the application (leading up to the debug pause) by measuring the number of debug context switches, and applying 530 a standard weight to each context switch based on a statistical model. The statistical model can be generated by offline performance analysis measurements in a performance lab or by running tests on the target machine.

Measuring 521 debug overhead at least in part by measuring resource utilization that is caused by debug builds 542 of code, where debug builds of code introduce extra code that is run, or different methods of accomplishing the same function but for debug purposes. In this case, call stacks 416 collected for statistical CPU sampling, allocation profiling, or other resource attribution can run against a set of rules that can qualify the call stack as debug or not. Similar to the stack tags feature in Windows Performance Analyzer, a set of rules that match known function names, or function call patterns, can be used to classify 566 the stacks. Additionally, information about which modules were debug builds and which were retail builds, optionally combined with other historical information can provide a hint as to which call stacks 416 are likely to be debug overhead when the set of rules is not sufficient. The number and locality of functions on the stack that are in debug modules can be used to assign 560 a probability that a stack was debug overhead. Call stacks that are marked as debug overhead can be subtracted 540 from CPU time, elapsed time, memory usage, network usage, disk usage, or other "resource utilization metrics" that may be shown to the user. Alternatively they could be used as a "confidence factor" to determine how much confidence we have that a measured performance issue would be a performance issue in a release build of the application when the debugger is not attached.

For instance, array bounds checking is present in debug builds and can often add significant overhead to code that operates over a large set of data in loops with small bodies. In this case, the functions related to array bounds checking 550 can be recognized as debug overhead, and stacks associated with bounds checking can be removed 548.

For instance, if 90% of the call stack is a consecutive region of debug calls, it could be considered to have a 25% probability of being a debug stack, and so 25% of such stacks should be discounted from the total resource computation. The actual numbers used would depend on various tests run on typical application programs 130.

For instance, if for 90% of the CPU Usage, the top of the stack (the actual instruction running on the CPU) is in a function that is part of a debug build of a module, it could be considered to have an 50% likelihood of being debug overhead, given that in typical device applications most of the time is spent in system code.

For instance, if 90% of the CPU Usage is in a system binary which is optimized code, and instrumentation of the application tells us that the code was only called once, it is very unlikely that the code is debug overhead.

For instance, if 90% of the CPU Usage is in functions that were observed earlier to be not optimized by the CLR JIT because a debugger was attached, 80% of that CPU Usage could be considered to be debug overhead.

In some examples, an enhanced debugger will show 508 the detected potential performance issues in the editor in the form of a subtle and easy-to-ignore performance tip 218, so that the user 104 is not annoyed and is instead inclined to leave tip 218 display 508 on as they step through code. If further information 511 is available, the debugger will allow the user to take action (e.g., click) on the performance tip. If the user clicks on a performance tip, a user-interface 511 is presented to the user appropriate to content of the performance tip. The presented user interface can show the user relevant and detailed information that was collected about the performance issue, or next step(s) they can take in order to get more detailed information. Next steps include turning on more data collection and analysis or links to more user interfaces that they can open a breakdown of the performance issue.

A Memory Issues Example

This section considers one example of the performance tips design which is focused around diagnosing memory 112 issues. However, there are many other examples, including a focus on one or more other computational resources 338 such as CPU usage, waiting on external service calls, and so on, which are possible as well. Computational resources 338 whose usage can be analyzed in ways described herein include, for example, memory usage by a native code portion of a software program, memory usage by a managed code portion of the software program, allocated heap memory usage, processor usage, thread activity, nonvolatile storage subsystem usage, network interface usage, electrical power usage, peripheral device usage, allocated resource usage, sampled uniformly weighted resource usage, or sampled proportionately weighted resource usage. Heap memory and disk space are two of the many possible examples of allocated resources. Sampling a CPU, a graphics processor, a numeric coprocessor, or another processor and giving each sample the same weight is an example of sampling uniformly weighted resource usage 334. Sampling the duration of ROM accesses, hard disk accesses, and other relatively long (compared to RAM access) operations are some examples of sampling proportionately weighted resource usage 336.

In one example, as shown in FIG. 7 a user 104 steps 517 over a line 212 of code and sees that the previous line of code took 1247 ms to execute. This is more execution time than the user expects and so they are inclined to find out more information by following up on the performance tip. Hovering over the 1247 ms tip 218 provides additional information, as illustrated in FIG. 8, including a statement that "Approximately 1,247 ms of program time elapsed since the last break in debugging. The process used about 25 ms of CPU in that time."

In another example, as shown in FIG. 9 a user 104 steps 517 over a line 212 of code and sees that the previous line of code took 1247 ms to execute and allocated 44 MB of memory. This is more memory than the user expects and so they are inclined to find out more information by following up on the performance tip. If the performance engine (e.g., profiler) had not been collecting detailed memory allocation information the user would have been presented with the option of turning this on, e.g., via a displayed statement such as "Turn on allocation tracking to view the breakdown of memory allocated by this line of code." The statement would include a clickable link to use in turning on allocation tracking.

In the example illustrated with FIG. 9, however, allocation tracking is already turned on. So after clicking on the +44 MB performance tip, the user is presented with a detailed breakdown 511 of the memory allocations, and is able to click on "More details . . . " to see these allocations in context of the overall memory state and other performance measurements of the system. Clicking on more details the user sees (in this example) information 511 that includes the total memory usage of the application 130 over time, as well as other metrics such as CPU Usage in some implementations. This will allow the user 104 to gauge how significant this performance issue is in context of the overall program's performance characteristics.

Additional Observations Regarding Performance Tips

In some examples, an enhanced debugger will subtly show how long code took to execute in a code editor during stepping 517, and under certain circumstances when running between specific points. One way that developers 104 evaluate performance is to step through code in the debugger and get a "gut feel" for how long it takes to run 516 between two points in the debugger. When the need arises to actually measure how long code takes to execute many developers use a "System.Diagnostics.Stopwatch" or other system clock to time how long the scenario takes. A reality is that many users of integrated development environments 144 only seek an order of magnitude approximation of actual resource usage to decide whether their code is "good enough" or needs improvement. Unfortunately when code needs improvement many developers are unlikely to turn to the profiling tools available because they are either unaware of them, or they perceive that they are too complicated for their purposes, so these developers will often continue to debug the issue iteratively by narrowing down the problem in the debugger. Additionally, the debugger gives fine grained execution control allowing the profiling between two exact points in the application.

In order to fit into this workflow of developers an enhanced debugger of the kind described herein can provide Performance Tips 218 in the debugger user interface 122 that will show developers how long code takes to execute between breaks. Additionally, when a developer is interested in investigating what is contributing to the execution time of a particular scenario, the debugger will enable the profiler 124 to run in the background while debugging, and the collected data 511 will be accessible from the performance tip.

Showing performance data in the editor while debugging will help developers think about performance throughout the development lifecycle, which will reduce the number of performance problems that escape to production.

Some decisions to be made when implementing one or more examples taught herein may include deciding when and what timing data will be shown in the editor when debugging, and deciding what extensibility mechanisms will be considered to enable future functionality integration. Some implementations will enable developers to see how long functions take to execute when stepping over lines of code in the debugger, enable developers to see how long it takes to execute between two points in the same call stack, enable developers to collect performance data beyond timing information while debugging, enable developers to inspect performance data beyond timing information while debugging, enable/consume a project-specific configuration for performance tip defaults, and/or create a "unified" configuration UI in Tools→Options to support performance tool integration with the debugger.

When a developer is at a break state, and then runs to the next break state, they will be shown a tip in the editor that displays how long the debuggee took to execute that code path. For instance in the screenshot of FIG. 7, the developer has stepped over line 73 and so is currently stopped on line 75.

As illustrated in FIG. 7, in some embodiments the right side of the line 212 of code was chosen as a performance tip location, even though it can shift position from left to right as one moves from one line to the subsequent line, because confidential early usability testing indicated that users 104 like the right side because it is easy to ignore if they didn't care about what is shown 508 there. Additionally right-side positioning provides the flexibility to extend the tip with additional information (e.g., network requests, database queries, etc.) without concern for colliding with source code. Such collisions would reduce user satisfaction with the feature.

In some examples, the timing information 210 will be displayed to the user if the elapsed time of the debuggee exceeds a predefined threshold (such as one defined below or one defined by a user), and the "run operation" under the debugger meets certain criteria.

One criterion is that the operation was any "Step" operation (Step Over, Step Into, Step Out). However, in some cases the debugger 120 must do a significant number of single step operations to correctly perform a "Step Into" (e.g., stepping from Script to Native in a worst case can result in ~100 single step operations). While each step has a small effect on the debuggee a large number will combine for a significant impact 204. So no performance tip will be shown in some examples if the debugger has more than thirty internal "stop" operations (internal meaning the IDE does not reflect the debugger is in a break state) since the data will likely be meaningless.

One criterion is that the user runs from a break state to a breakpoint or performs a "Run to cursor" and the same method the instruction pointer originated in is on the call stack. That is, The method stopped in is the same as the method that that the "run operation" originated in; or the user is in a nested call and measured how long it took to run to that point from the point of origin; or the method is being called back in a loop (e.g. via a timer or an onrender event), and the user is measuring the elapsed time between the call. For example the user stops at the end of their "MainPage.onrender( )" method, they set a breakpoint on the first line of the "MainPage.onrender( )" method and press F5. When they hit the breakpoint they will see how long elapsed before the runtime called this same method back again.

For source examples see Perf Tip Example Behavior section herein.

One criterion is that tips 218 will be shown based on the call stack with the following constraints:

There will be no depth limit to how far up the call stack some examples will search for the method that the run originated in (the tip will only trigger a call stack walk on the same cadence as the call stack window—see Data Presentation section for details). While call stack walks can be expensive, the majority of users already have the call stack window open or the stack frame drop down which result in a stack walk anyway.

If the method the run originated in is on the async call stack (not just the physical stack) some examples will also show the tip.

One criterion in some examples is that the tip will show 508 regardless of any thread ID considerations; the cost of trying to show thread ID with async programming may be high. Users already have to deal with this (or work around it) with breakpoints 228 as they exist today, and this can be worked around with breakpoint filters or thread/task freezing just as it is today. However, other examples will show thread IDs.

In some examples, tips 218 will be shown 508 on an exception assuming the current call stack meets the applicable criteria.

Such criteria are intended to help developers 104 obtain meaningful metrics for code paths that are logically related in terms of the flow of the application 130. Some implementations try to avoid confusing developers by not showing performance information that might be meaningless from an application standpoint (e.g. how long elapsed between requests of different ASP.NET or other web pages, or different user gestures such as a button click). But even though showing the elapsed time between page requests of the same web page could introduce extra performance overhead on the debugging scenario to detect when the method instance has been exited, some examples initially leave it to the developers to determine if the data is interesting to them in such cases.

In some examples, the time displayed 508 will be the total elapsed (or system) time that occurs. A tool tip will contain the CPU time (Process Time) consumed by the process during that time to help steer developers to the correct tool. If a module loads during the elapsed time the debugger will filter the time the process is stopped while it performs work (e.g. loading symbols) from the elapsed time.

Perf Tip Example Behavior

Some illustrative scenarios below refer to the following sample source code 132; line numbers are shown in a column along the left hand side:

```
1       async void MainPage__Loaded(object sender,
RoutedEventArgs e)
2       {
3           sum(10000000);
4           await processImages( );
5       }
6       private async void btnLoadPictures__Click(object
sender, RoutedEventArgs e)
7       {
8           await processImages( );
9       }
10      private async Task processImages( )
11      {
12          var folder =
Windows.Storage.KnownFolders.PicturesLibrary;
13          await ProcessSubFolders(folder);
14      }
15      async Task ProcessSubFolders(StorageFolder
currentFolder)
16      {
17          var subFolderQuery =
currentFolder.CreateFolderQuery( );
18          var folders = await
subFolderQuery.GetFoldersAsync( );
19          await processImageFiles(currentFolder);
20      }
21      void sum(int max)
22      {
23          int sum = 0;
24          for (int x = 0; x < max; x++)
25          {
```

-continued

```
26          sum += x;
27        }
28    }
```

Scenario 1. The user is at a break state with the instruction pointer on line 3. They set a breakpoint on line 28. They press F5 and hit the breakpoint. If the elapsed time exceeds the threshold, then a performance tip will be shown 508 because MainPage_Loaded is on the call stack.

Scenario 2. The user is at a break state with the instruction pointer on line 4. They do a step over and stop on line 5. If the elapsed time exceeds the threshold, then a performance tip will be shown 508 because they are in the same method the run originated from.

Scenario 3. The user is at a break state with the instruction pointer on line 3. They set a breakpoint on line 20. They press F5, and the breakpoint on line 20 is hit. If the elapsed time exceeds the threshold, then a performance tip will be shown 508 because MainPage_Loaded is on the async call stack.

Scenario 4. The user is at a break state with the instruction pointer on line 3. They press 5 and the application loads as expected. They set a breakpoint on line 20. They click the btnLoadPictures button and the breakpoint on line 20 is hit. No performance tip will be shown 508, because the run originated in MainPage_Loaded and when the application breaks MainPage_Loaded is not on the call stack.

Data Presentation

When there is performance data 206, 218, and/or 511 to show a developer when running under the debugger in some implementations it will be shown in the editor to the right of the current line 212 with the instruction pointer when the break occurs. If the user manually changes the instruction pointer location while in the break state (e.g. drags it or does a set next statement) the tip 218 will not change location, it will remain in at the original location.

One approach is to place the tips 218 (e.g., textual representations 210) to the right of the line they applied to in the case of a step over. However some examples use the placement shown above, because they implement support for the current line anyway for "to run" operations, the perf tip is more noticeable in this location, and it can be moved in other versions if desired.

In one implementation, the perf tip 218 will fade in with a duration of 200 ms. In some it will be drawn 15 pixels to the right of the end of the line of code; if the user has a pinned DataTip already present on this line the performance tip will appear to the right of the pinned DataTip, and if the user tries to pin a DataTip on a line that has a performance tip, the DataTip will pin to the right of the Performance Tip 218. In some implementations the perf tip will be at least partially presented in the form of "<time in milliseconds>ms". Time will always be presented in milliseconds to maintain consistency, and large numbers will use locale specific formatting (e.g. 1000 will present as 1,000 in Europe and 1.000 in locales that use the . instead of the ,). In some implementations the Performance Tip will disappear when the IDE enters "run" state again, meaning it will be consistent to show when the yellow instruction pointer arrow shows, and disappear when the yellow instruction pointer disappears. In some implementations the performance tip 218 will be drawn on the same cadence as the rest of the UI updates that occur in the debugger (watch window, call stack window—currently 150 ms deley) to avoid introducing additional performance overhead when a user "fast steps". In some implementations performance tips will not be able to be moved or closed. In some implementations, when the user hovers over the performance tip they will be given a tooltip explaining what this data means in the form 594 of "Approximately _____ ms of total program time elapsed since the last break in debugging. The process used about _____ ms of CPU in that time."

Fonts and Colors

In some implementations the enhanced debugger will re-use the font and color settings defined by an existing tool 126. As a particular non-limiting example, some examples use the font and color settings defined by the Microsoft CodeLens® tool (mark of Microsoft Corporation), but create their own brushes and entry in Tools→Options→General→Fonts and Colors, titled "Performance Tips" with the following settings.

Font size: 8 (default editor font size—2)
Font: Calibri
Tip Text:
Light: #FF999999
Dark: #FF999999
Blue: #FF999999
High Contrast (HC): System.GrayText
Hovered Text:
Light: #FF0E70C0
Dark: #FF0097FB
Blue: #FF0E70C0
HC: System.HotTrack Note: because these are configurable as a setting available in the Fonts and Colors, these settings will not change when the user changes their editor configuration, they will need to update these in fonts and colors.

Threshold and Configurability

This configuration dialog is the purpose of enabling a user experience with the tips 218 in a discoverable and usable form (as opposed to relying on registry keys for example). For that reason, some implementations will re-use the existing "Performance and Diagnostics" page that is already present in the IDE.

In some examples, performance tips are definable within a project system and can be configured on a per project (or per solution) basis where specific project types can define goals that make sense for that project type (e.g. a DirectX C++ app would generally have very different goals than an ASP.NET app). Additionally some provide a unified "configuration" story between the debugger and profiler integration.

In some examples, the default threshold for elapsed time will be 15 ms. This means that if the debuggee 130 is running for less than 15 ms between break operations no performance tip will be shown 508. In some, there will be two configuration options added to allow users to control performance tips. One is a checkbox that enables/disables performance tips. The other is a textbox that allows users to define the threshold in milliseconds. Values of less than 1 will not be accepted. If the user enters a value of less than 1, the tool will show an error message that "1 is the minimum allowed value". A maximum value accepted is not imposed. In some versions, these settings will be added to the Tools→Options→Performance Tools→Performance and Diagnostics options page; they will be in a "Performance Tips" group. Disabling "show performance tips while debugging" will disable the checkboxes for all child settings (for this experience this is only the elapsed time threshold).

Extensibility

Some implementations will enable profiling data 511 to be integrated into an experience that will show developers what occurred during that time. To enable this, the performance indicators will be implemented in various ways. In one approach, tool extension can add additional indicator tips like the timing tip defined in this experience. E.g. adding a performance tip to display memory information. A complementary user interface can be shown from an indicator tip that will appear when clicked.

Telemetry

As part of implementing performance tips 218, considering the following questions may be helpful. What percentage of the time are performance tips being displayed (# of times PerfTips are displayed/Total number of qualifying stop events)? What are the times being displayed in a performance tip? What number of debugger launches with performance tips are enabled, versus number of debugger launches with performance tips disabled?

With regard to writing the performance time to the output window, some examples provide a "debug log" view available in a diagnostics hub in addition to, or instead of, a debugger output window.

With regard to the number of performance tips 218 visible to a user 104 on a screen 138 for a given program 130 at a given time, one approach is to maintain a limited number of tips (greater than one) visible to build a small hot path. In other examples, only one perf tip is shown 508 at a time (on the current line). A risk of additional perf tips is that when adding new meta-data into the editor customers may turn it off because they find it visually noisy.

Some examples give users 104 the ability to move or hide displayed tips, or give users the ability to close or move tips in the editor. Some give users the ability to customize how time units are displayed (or automatically adjust based on the minimum specific threshold). In scenarios where calls can take very long times users may want the ability to choose to display times in larger units than milliseconds (e.g. web service developers may want to think in terms of seconds rather than milliseconds).

CONCLUSION

Although particular examples are expressly described herein as processes, as configured media, or as systems, it will be appreciated that discussion of one type of example also generally extends to other example types. For instance, the descriptions of processes also help describe configured media, and help describe the technical effects and operation of systems and manufactures. It does not follow that limitations from one example are necessarily read into another. In particular, processes are not necessarily limited to the data structures and arrangements presented while discussing systems or manufactures such as configured memories.

Reference herein to an example having some feature X and reference elsewhere herein to an example having some feature Y does not exclude from this disclosure examples which have both feature X and feature Y, unless such exclusion is expressly stated herein. The term "example" is merely used herein as a more convenient form of "process, system, article of manufacture, configured computer readable medium, and/or other example of the teachings herein as applied in a manner consistent with applicable law." Accordingly, a given "example" may include any combination of features disclosed herein, provided the example is consistent with at least one claim.

Not every item stated need be present in every example. Although some possibilities are illustrated here by specific examples, examples may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some examples; one of skill recognizes that functionality modules can be defined in various ways in a given implementation without necessarily omitting desired technical effects from the collection of interacting modules viewed as a whole.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary examples have been described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every example. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computational process for use in software development, comprising:
   automatically obtaining raw performance information for a software program which is being debugged in a debugger which has a graphical user interface;
   automatically removing a measured diagnostic overhead from at least part of the raw performance information, thereby producing at least one adjusted program performance measure; and
   automatically displaying in the debugger graphical user interface a visual representation of the adjusted program performance measure and at least a number of lines of source code whose corresponding executable contributed most recently to the program performance that is measured by the adjusted program performance measure, the number being in the range from one to four.

2. The process of claim 1, wherein the raw performance information includes a raw value for at least one of the following program performance measures: memory usage by a native code portion of the software program, memory usage by a managed code portion of the software program, memory usage by a particular processor, memory usage by a central processing unit, memory usage by a floating point processing unit, memory usage by a graphical processing unit, allocated heap memory usage, processor usage, central processing unit utilization, floating point processing unit utilization, graphical processing unit utilization, low-level processor events, cache misses, branch mis-predictions, pipeline stalls, read/write hazards, number of instructions executed, elapsed running time of application code, frame rate, thread activity, nonvolatile storage subsystem usage, network interface usage, electrical power usage, peripheral device usage, allocated resource usage, sampled uniformly weighted resource usage, or sampled proportionately weighted resource usage.

3. The process of claim 1, further comprising providing updated visual representations of the adjusted program performance measure in a source code window of the debugger in response to execution of portions of the software program in the debugger.

4. The process of claim 1, wherein removing a measured diagnostic overhead comprises at least one of the following:
ascertaining a pause start time and a pause stop time indicating when execution of the software program was paused in the debugger, and removing paused time from a running time that is calculated for the software program;
ascertaining a pause start time and a pause stop time indicating when execution of the software program was paused in the debugger, and removing usage of a computational resource during the paused time from a resource usage that is calculated for the software program;
assigning a context switch count representing how many debug context switches occurred during an execution period of the software program in the debugger, and adjusting a raw program performance measure based on the context switch count;
adjusting a raw program performance measure based on statistical information about debug build presence in at least a portion of the software program;
adjusting a raw program performance measure based on statistical information about release build presence in at least a portion of the software program;
adjusting a raw program performance measure based on array bound checking code presence in at least a portion of the software program;
adjusting a raw program performance measure based on information about how many times functions in debug builds were called and information about how many times functions in release builds were called during execution of the software program;
adjusting a raw program performance measure based on a calculated probability that a portion of the software program is a debug build rather than a release build;
adjusting a raw program performance measure based on a calculated probability that a portion of the software program is a release build rather than a debug build;
adjusting a raw program performance measure based on a call stack analysis which classifies a portion of the software program as a debug build;
adjusting a raw program performance measure based on overhead from a diagnostic tool other than a debugger;
adjusting a raw program performance measure based on debugger funceval overhead; or
adjusting a raw program performance measure based on a call stack analysis which classifies a portion of the software program as a release build.

5. The process of claim 1, wherein the displaying step displays a visual representation of the adjusted program performance measure for an executed portion of the software program, wherein a boundary of the executed portion corresponds with a line of source code text displayed in a source code window, and wherein at least a portion of the visual representation of the adjusted program performance measure is displayed in a display area which is within zero to three horizontal text lines' distance of the source code text.

6. The process of claim 1, wherein the visual representation has a link to additional program performance information, and the process further comprises:
receiving a selection of the visual representation by a user; and then
displaying at least a portion of the additional program performance information.

7. The process of claim 6, wherein receiving a selection of the visual representation comprises at least one of the following:
determining that a user has clicked on the visual representation;
determining that a user has touched the visual representation;
determining that a user cursor is hovering over the visual representation; or
determining that a user has selected the visual representation at least in part by using a keyboard.

8. The process of claim 1, wherein the displaying step displays a visual representation of the adjusted program performance measure which is easily-ignored in that it has at least three of the following characteristics:
the visual representation does not obscure or hide any of the software program's source code in the debugger unless the visual representation is selected;
the visual representation does not obscure or hide any user interface control for starting or pausing execution of the software program in the debugger;
the visual representation does not obscure or hide any user interface control for setting or clearing a breakpoint in the debugger;
the visual representation displays text in a font size that is no larger than the font size used for displaying source code text in the debugger;
the visual representation uses less than twenty characters of text per adjusted program performance measure unless the visual representation is selected to display additional information;
selection of the visual representation is not required in order to start or pause execution of the software program in the debugger; or
selection of the visual representation is not required in order to set or clear a breakpoint in the debugger.

9. A computer-readable storage medium configured with data and with instructions that when executed by at least one processor causes the processor(s) to perform a technical process for providing performance information during debugging of a software program, the process comprising the steps of:
automatically obtaining raw performance information for a software program which is being debugged in a debugger which has a graphical user interface, wherein the raw performance information includes a raw value for at least one of the following program performance measures: memory usage by a native code portion of the software program, memory usage by a managed code portion of the software program, allocated heap memory usage, processor usage, thread activity, nonvolatile storage subsystem usage, network interface usage, electrical power usage, peripheral device usage, allocated resource usage, sampled uniformly weighted resource usage, or sampled proportionately weighted resource usage;

automatically removing a measured debug overhead from at least part of the raw performance information, thereby producing at least one adjusted program performance measure;

automatically displaying in a source code window of the debugger graphical user interface a visual representation of the adjusted program performance measure; and providing updated visual representations of the adjusted program performance measure in the source code window in response to execution of portions of the software program in the debugger.

10. The computer-readable storage medium of claim 9, wherein the process comprises at least two of the following:

ascertaining a pause start time and a pause stop time indicating when execution of the software program was paused in the debugger, and removing paused time from a running time that is calculated for the software program;

ascertaining a pause start time and a pause stop time indicating when execution of the software program was paused in the debugger, and removing usage of a computational resource during the paused time from a resource usage that is calculated for the software program;

assigning a context switch count representing how many debug context switches occurred during an execution period of the software program in the debugger, and adjusting a raw program performance measure based on the context switch count;

adjusting a raw program performance measure based on array bound checking code presence in at least a portion of the software program;

adjusting a raw program performance measure based on an estimated ratio of debug code to release code within a specified portion of executed code; or adjusting a raw program performance measure based on information about how many times functions in debug builds were called and information about how many times functions in release builds were called during execution of the software program.

11. The computer-readable storage medium of claim 9, wherein the process comprises at least two of the following:

adjusting a raw program performance measure based on statistical information about debug build presence in at least a portion of the software program;

adjusting a raw program performance measure based on statistical information about release build presence in at least a portion of the software program;

adjusting a raw program performance measure based on a calculated probability that a portion of the software program is a debug build rather than a release build;

adjusting a raw program performance measure based on a calculated probability that a portion of the software program is a release build rather than a debug build;

adjusting a raw program performance measure based on a call stack analysis which classifies a portion of the software program as a debug build; or adjusting a raw program performance measure based on a call stack analysis which classifies a portion of the software program as a release build.

12. The computer-readable storage medium of claim 9, wherein the displaying step displays a visual representation of the adjusted program performance measure for an executed portion of the software program, wherein a boundary of the executed portion corresponds with source code text displayed in the source code window, and wherein the visual representation of the adjusted program performance measure is displayed in the source code window to the right of the source code text.

13. The computer-readable storage medium of claim 9, wherein the visual representation operates as a tool tip to provide additional program performance information.

14. The computer-readable storage medium of claim 9, wherein the displaying step displays a visual representation of the adjusted program performance measure which is easily-ignored in that it has at least four of the following characteristics:

the visual representation does not obscure or hide any of the software program's source code in the debugger unless the visual representation is selected;

the visual representation does not obscure or hide any user interface control for starting or pausing execution of the software program in the debugger;

the visual representation does not obscure or hide any user interface control for setting or clearing a breakpoint in the debugger;

the visual representation displays text in a font size that is no larger than the font size used for displaying source code text in the debugger;

the visual representation uses less than twenty characters of text per adjusted program performance measure unless the visual representation is selected to display additional information;

selection of the visual representation is not required in order to start or pause execution of the software program in the debugger; or selection of the visual representation is not required in order to set or clear a breakpoint in the debugger.

15. A computer system comprising:

a processor;

a memory in operable communication with the processor;

a profiler residing in the memory and having code which upon execution with the processor obtains raw performance information for a software program;

a debug overhead removal code which upon execution with the processor produces at least one adjusted program performance measure for the software program at least in part by removing a measured debug overhead from at least part of the raw performance information obtained by the profiler; and a debugger residing in the memory and having a graphical user interface which upon execution with the processor provides commands to set or clear user-specified breakpoints in the software program, the debugger also being a source of at least part of the measured debug overhead, the debugger also having code which upon execution with the processor displays the adjusted program performance measure in the debugger graphical user interface.

16. The system of claim 15, wherein the debug overhead removal code comprises at least one of the following:

code for measuring debug overhead based on a pause start time and a pause stop time which together indicate when execution of the software program was paused in the debugger;

code for measuring debug overhead based on how many debug context switches occurred during an execution period of the software program in the debugger; or code for measuring debug overhead based on a debug build presence in at least a portion of the software program.

17. The system of claim 15, wherein the system is further characterized in at least one of the following ways:

the adjusted program performance measure is displayed in the debugger graphical user interface in a display area which is within zero to five horizontal text lines' distance of a source code text to which the adjusted program performance measure pertains; or the adjusted program performance measure is displayed in a source code window in the debugger graphical user interface and is displayed to the right of a source code text to which the adjusted program performance measure pertains.

18. The system of claim 15, wherein the system is further characterized in at least one of the following ways:

the displayed adjusted program performance measure does not obscure or hide any of the software program's source code in display areas of the debugger;

the displayed adjusted program performance measure does not obscure or hide any user interface control for starting or pausing execution of the software program in the debugger; or the displayed adjusted program performance measure does not obscure or hide any user interface control for setting or clearing a breakpoint in the debugger.

19. The system of claim 15, wherein the system is further characterized in at least one of the following ways:

the displayed adjusted program performance measure displays text in a font size that is no larger than the font size used for displaying source code text in the debugger;

the displayed adjusted program performance measure uses less than twenty characters of text per computational resource usage shown;

an adjusted program performance measure value displayed for a given line of source code text is undisplayed when another adjusted program performance measure value is displayed for a subsequent line of source code text; or the displayed adjusted program performance measure consists of text which conforms to the following syntax: <integer>[white space]<time unit>, where <time unit> denotes at least one of: milliseconds, fractions of a second, seconds, or processor cycles.

20. The system of claim 15, wherein the adjusted program performance measure is displayed in the debugger by default when (a) source code of the software program is displayed in the debugger, and (b) the adjusted program performance measure exceeds a predefined threshold.

* * * * *